(12) United States Patent
Aoki et al.

(10) Patent No.: US 11,851,234 B2
(45) Date of Patent: Dec. 26, 2023

(54) PLASTIC CONTAINER AND METHOD FOR PRODUCING SAME

(71) Applicants: KYORAKU CO., LTD., Kyoto (JP); TOYO ALUMINIUM KABUSHIKI KAISHA, Osaka (JP)

(72) Inventors: Tatsuro Aoki, Yamato (JP); Takayoshi Hosoya, Yamato (JP); Taro Ikeda, Tokyo (JP); Hiroaki Awata, Osaka (JP)

(73) Assignees: KYORAKU CO., LTD., Kyoto (JP); TOYO ALUMINIUM KABUSHIKI KAISHA, Osaka (JP)

( * ) Notice: Subject to any disclaimer, the term of this patent is extended or adjusted under 35 U.S.C. 154(b) by 253 days.

(21) Appl. No.: 17/421,218

(22) PCT Filed: Jan. 23, 2020

(86) PCT No.: PCT/JP2020/002285
§ 371 (c)(1),
(2) Date: Jul. 7, 2021

(87) PCT Pub. No.: WO2020/153421
PCT Pub. Date: Jul. 30, 2020

(65) Prior Publication Data
US 2022/0063858 A1 Mar. 3, 2022

(30) Foreign Application Priority Data
Jan. 24, 2019 (JP) .................. 2019-010513

(51) Int. Cl.
*B65D 1/02* (2006.01)
*B65D 23/04* (2006.01)
(Continued)

(52) U.S. Cl.
CPC ........ *B65D 1/0215* (2013.01); *B29C 49/0005* (2013.01); *B65D 23/02* (2013.01);
(Continued)

(58) Field of Classification Search
CPC .. B65D 1/0215; B65D 23/0828; B32B 27/14; B32B 27/20; B32B 27/205
See application file for complete search history.

(56) References Cited

U.S. PATENT DOCUMENTS

| | | |
|---|---|---|
| 2015/0108032 A1 | 4/2015 | Akutsu et al. |
| 2015/0353271 A1 | 12/2015 | Akutsu et al. |

(Continued)

FOREIGN PATENT DOCUMENTS

| | | |
|---|---|---|
| JP | 2013-105411 A | 5/2013 |
| JP | 2015-042481 A | 3/2015 |

(Continued)

OTHER PUBLICATIONS

International Search Report dated Mar. 3, 2020 of corresponding International Application No. PCT/JP2020/002285; 5 pgs.

(Continued)

*Primary Examiner* — Andrew T Kirsch
(74) *Attorney, Agent, or Firm* — Maier & Maier, PLLC

(57) ABSTRACT

The present invention provides a plastic container with excellent slipping property for contents. According to the present invention, provided is a plastic container for storing contents, wherein the plastic container is a blow molded body, an innermost layer in contact with the contents is formed of a resin composition containing a base resin and filler particles, and an inner surface of the innermost layer is provided with concave and convex shapes due to presence of the filler particles.

5 Claims, 4 Drawing Sheets

(51) Int. Cl.
  B29L 31/00 (2006.01)
  B29C 49/00 (2006.01)
  B65D 23/02 (2006.01)
  B29K 105/00 (2006.01)
  B29L 23/00 (2006.01)

(52) U.S. Cl.
  CPC ...... B65D 23/04 (2013.01); *B29K 2105/0005* (2013.01); *B29L 2023/003* (2013.01); *B29L 2031/7158* (2013.01)

(56) References Cited

U.S. PATENT DOCUMENTS

| | | |
|---|---|---|
| 2016/0152786 A1 | 6/2016 | Akutsu et al. |
| 2018/0086037 A1* | 3/2018 | Araki ................. C08J 7/046 |
| 2018/0134004 A1 | 5/2018 | Nyuu et al. |
| 2018/0162595 A1 | 6/2018 | Komatsu et al. |

FOREIGN PATENT DOCUMENTS

| | | | |
|---|---|---|---|
| JP | 2016-203527 A | 12/2016 |
| JP | 2016-222348 A | 12/2016 |
| JP | 2017-144674 A | 8/2017 |
| JP | 2018-158763 A | 10/2018 |

OTHER PUBLICATIONS

Extended European Search Report dated Jan. 11, 2022, of corresponding European patent application No. 20744722.8, 9 pgs.

\* cited by examiner

PLASTIC CONTAINER AND METHOD FOR PRODUCING SAME

TECHNICAL FIELD

The present invention relates to a plastic container and its manufacturing method.

BACKGROUND ART

Patent Literature 1 discloses a plastic container with excellent slipping property for its contents.

CITATION LIST

Patent Literature

Patent Literature 1: JP-A-2013-10541

SUMMARY OF INVENTION

Technical Problem

In Patent Literature 1, the slipping property is improved by adding a lubricant to a base resin in contact with the contents. However, there is a need to improve the slipping property by another means.

The present invention has been made in view of such circumstances, and an objective thereof is to provide a plastic container with excellent slipping property for the contents.

Solution to Problem

According to the present invention, provided is a plastic container for storing contents, wherein the plastic container is a blow molded body, an innermost layer in contact with the contents is formed of a resin composition containing a base resin and filler particles, and an inner surface of the innermost layer is provided with concave and convex shapes due to presence of the filler particles.

In the plastic container of the present invention, since the concave and convex shapes are provided on the inner surface of the innermost layer, the friction between the inner surface of the innermost layer and the contents is reduced, and the slipping property is improved. Further, the plastic container of the present invention is a blow molded body and is provided with the concave and convex shapes due to the presence of the filler particles contained in the resin composition forming the innermost layer, which makes it easy to form the concave and convex shapes during manufacturing.

Hereinafter, various embodiments of the present invention will be exemplified. The embodiments described hereinafter can be combined with each other.

Preferably, in the above-mentioned plastic container, T/D is 0.80 to 1.40 where T represents an average thickness of the innermost layer at a center of the plastic container in a vertical direction, and D represents an average particle diameter of the filler particles.

Preferably, in the above-mentioned plastic container, at least a part of the filler particles is exposed from the inner surface of the innermost layer.

Preferably, in the above-mentioned plastic container, the resin composition has a content of the filler particles of 15 to 50% by mass.

Preferably, in the above-mentioned plastic container, the filler particles are formed of an acrylic resin.

Preferably, in the above-mentioned plastic container, the base resin is polyolefin.

Preferably, in the above-mentioned plastic container, a liquid repellent agent adheres to a surface of the concave and convex shapes.

According to another viewpoint of the present invention, provided is a manufacturing method of the above-mentioned plastic container, comprising a molding step of blow molding a parison, wherein an innermost layer of the parison is formed of the resin composition, and the parison is expanded so that the concave and convex shapes are formed on an inner surface of the innermost layer by the filler particles.

DESCRIPTION OF EMBODIMENTS

Hereinafter, various embodiments of the present invention will be described. Various features described in the following embodiments can be combined with each other. In addition, an invention can be established independently for each of the features.

1. Configuration of Plastic Container

Figure 1:
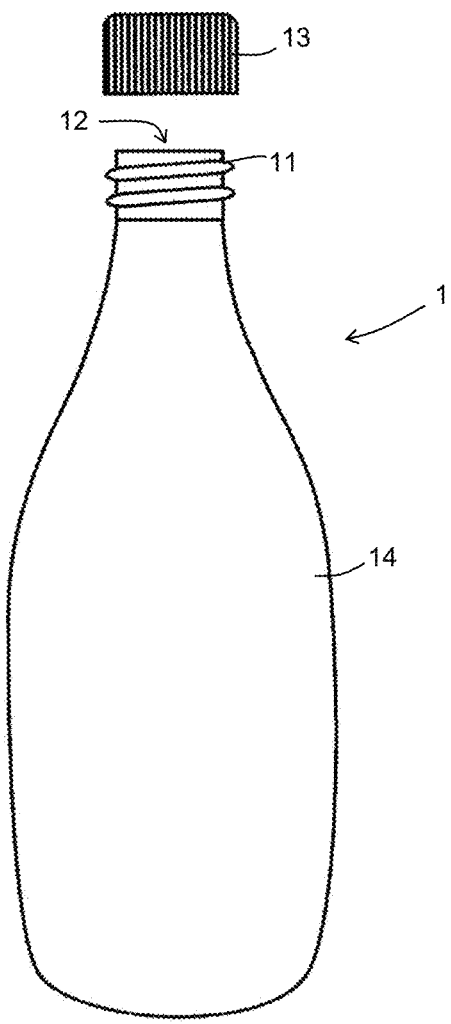
FIG. 1 is an elevational view showing a plastic container 1 and a cap 13.

FIG. 1 is a schematic diagram of a plastic container 1 of an embodiment of the present invention. As shown in FIG. 1, the container 1 is a container for storing contents. Examples of the contents include viscous substances, such as mayonnaise and ketchup. The container 1 is configured such that the contents are released from a spout 12 provided with a thread 11 by squeezing a body portion 14, and the spout 12 is usually sealed with a cap 13. The container 1 is a blow molded body formed by blow molding. The details of blow molding will be described later.

Figure 2:
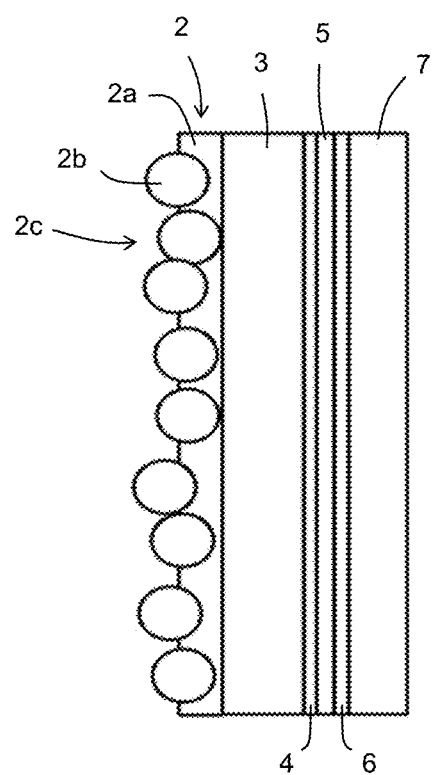
FIG. 2 is a diagram showing a layer structure of the plastic container 1.

The container 1 may have a single-layer structure or a multi-layer structure and preferably has a multi-layer structure. FIG. 2 shows an example of a layer structure of the container 1, and the layer structure includes, in order from an inner surface side of the container 1, an innermost layer 2, an intermediate layer 3, an adhesive resin layer 4, a barrier layer 5, an adhesive resin layer 6, and an outermost layer 7. In the layer structure of the container 1, at least one of these layers may be omitted, and another layer may be included. Each layer will be described below.

(Outermost Layer 7)

The outermost layer 7 is formed of a resin composition containing a thermoplastic resin, such as polyolefin, and the resin composition preferably contains a lubricant. This prevents the occurrence of problems due to poor slippage on the surface of the container 1.

(Barrier Layer 5)

The barrier layer 5 is formed of a resin with high gas barrier property. Examples of such a resin include ethylene vinyl alcohol copolymer (EVOH: including ethylene-vinyl acetate copolymer saponified product and the like), aromatic polyamide and the like. By providing the barrier layer 5, oxidative degradation of the contents due to oxygen permeation can be effectively suppressed.

(Intermediate Layer 3)

The intermediate layer 3 is formed of a resin composition containing a thermoplastic resin, such as polyolefin. The intermediate layer 3 may be omitted. The intermediate layer 3 may be a repro layer made of a material recycled from burrs generated during blow molding of the container 1.

(Adhesive Resin Layers 4, 6)

The adhesive resin layers 4, 6 are formed of an adhesive resin. Examples of the adhesive resin include an acid-modified polyolefin resin (e.g., maleic anhydride-modified polyethylene, maleic anhydride-modified polypropylene) and the like. By providing the adhesive resin layers 4, 6, the adhesiveness between the barrier layer 5 and the outermost layer 7 or the intermediate layer 3 can be improved. Instead of providing the adhesive resin layers 4, 6, an adhesive resin may be blended into the barrier layer 5.

(Innermost Layer 2)

The innermost layer 2 is a layer in contact with the contents and is formed of a resin composition containing a base resin 2a and filler particles 2b. Concave and convex shapes 2c (uneven shape) due to the presence of the filler particles 2b are provided on an inner surface of the innermost layer 2 (that is, an inner surface of the container 1). Since the concave and convex shapes 2c are provided on the inner surface of the innermost layer 2, the friction between the inner surface of the innermost layer 2 and the contents is reduced, and the slipping property is improved.

A ten-point average roughness Rz of the concave and convex shapes 2c is preferably 7 to 500 μm, more preferably 10 to 300 μm, most preferably 10 to 100 μm. By setting the ten-point average roughness Rz within this range, the slipping property can be particularly improved. The ten-point average roughness Rz is defined in accordance with JIS B0601(-1982).

The base resin 2a is preferably a thermoplastic resin, such as polyolefin. Examples of such polyolefin include polyethylene and polypropylene.

The filler particles 2b are particles capable of providing the concave and convex shapes 2c, and the filler particles containing at least one type of organic components and inorganic components can be adopted.

As the inorganic components, for example, 1) metals, such as aluminum, copper, iron, titanium, silver, and calcium, or alloys or intermetallic compounds containing these metals, 2) oxides, such as silicon oxide, aluminum oxide, zirconium oxide, titanium oxide, and iron oxide, 3) inorganic or organic acid salts, such as calcium phosphate and calcium stearate, 4) glass, and 5) ceramics, such as aluminum nitride, boron nitride, silicon carbide, and silicon nitride can be suitably used.

As the organic components, for example, organic polymer components (or resin components), such as acrylic resin, urethane resin, melamine resin, amino resin, epoxy resin, polyethylene resin, polystyrene resin, polypropylene resin, polyester resin, cellulose resin, vinyl chloride resin, polyvinyl alcohol, ethylene-vinyl acetate copolymer, ethylene-vinyl alcohol copolymer, ethylene-ethyl acrylate copolymer, polyacrylonitrile, and polyamide can be suitably used.

The filler particle 2b is preferably acrylic resin. This is because the acrylic resin has high transparency, and thus the addition of the filler particles 2b is unlikely to cause a decrease in transparency.

When Ta represents the melting point of the base resin 2a, and Tb represents the melting point of the filler particle 2b, Tb-Ta is preferably 10° C. or higher, more preferably 30° C. or higher, and even more preferably 50° C. or higher. This is because, if the filler particles 2b are melted when the base resin 2a is heated to melt in manufacturing the container 1 by blow molding, it becomes difficult to form the concave and convex shapes 2c.

The average particle diameter of the filler particles 2b is preferably 10 to 100 μm, more preferably 20 to 80 μm, and even more preferably 30 to 50 μm. This average particle diameter may be specifically, for example, 10, 20, 30, 40, 50, 60, 70, 80, 90, 100 μm and may be within a range between any two of the values exemplified herein. If the average particle diameter is too small, it is difficult to form the concave and convex shapes 2c, and if the average particle diameter is too large, the filler particles 2b are likely to detach and fall off from the innermost layer 2. The average particle diameter of the filler particles 2b can be measured by a laser diffraction particle size analyzer. If it is difficult to measure it by the laser diffraction particle size analyzer, the particles can be observed by a microscope (or a photograph of the particles can be taken). If the particle has a spherical shape, its diameter can be used, and if the particle has a non-spherical shape, the average value of the largest diameter and the smallest diameter can be regarded as its diameter. Then, the average value of the diameters of 10 particles selected arbitrarily by microscopic observation can be used as the average particle diameter.

The shape of the filler particles 2b is not particularly limited, and the particles may have, for example, a spherical shape, spheroid shape, irregular and indefinite shape, teardrop shape, flat shape, hollow shape, porous shape, or the like.

When T represents the average thickness of the innermost layer 2 at the center of the container 1 in the vertical direction, and D represents the average particle diameter of the filler particles 2b, T/D is preferably 0.50 to 2.00, and more preferably 0.80 to 1.40. The average thickness of the innermost layer 2 can be calculated by arithmetically averaging the thicknesses measured at four measuring points evenly spaced in the circumferential direction on the container wall surface cut out from the center of the container 1 in the vertical direction. If T/D is too small, the filler particles 2b are likely to detach and fall off from the innermost layer 2, and if T/D is too large, the concave and convex shapes on the surface of the innermost layer 2 tend to be insufficient. T/D may be specifically, for example, 0.50, 0.70, 0.80, 0.85, 0.90, 0.95, 1.00, 1.05, 1.10, 1.15, 1.20, 1.25, 1.30, 1.35, 1.40, 1.50, 2.00 and may be within a range between any two of the values exemplified herein.

Although the filler particles 2b may be embedded in the base resin 2a, it is preferable that at least a part of the particles is exposed from the inner surface of the innermost layer 2. In such a case, the concave and convex shapes 2c can be easily formed. Further, when the filler particles 2b have slipping property superior to that of the base resin 2a, the slipping property can be further improved by exposing the filler particles 2b from the inner surface of the innermost layer 2.

The content of the filler particles 2b in the resin composition is preferably 15 to 50% by mass and more preferably 20 to 40% by mass. The content may be specifically, for example, 15, 20, 25, 35, 40, 45, 50% by mass and may be within a range between any two of the values exemplified herein. If the content of the filler particles 2b is too small, the concave and convex shapes 2c tend to be insufficient, and if the content of the filler particles 2b is too large, the filler particles 2b are likely to detach and fall off from the innermost layer 2.

A lubricant may be added to the resin composition forming the innermost layer 2 to further improve the slipping property.

(Liquid Repellent Agent)

Figure 3:
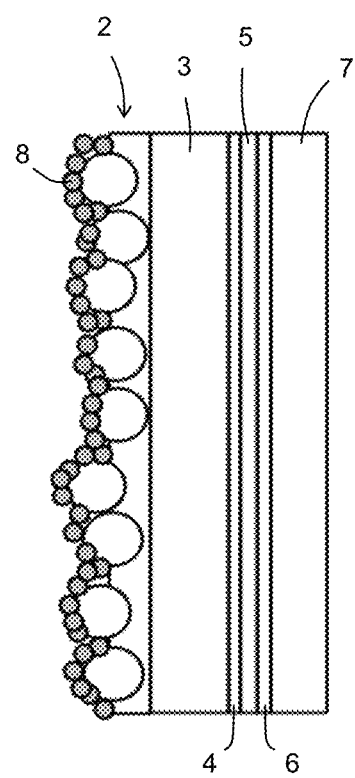
FIG. 3 is a diagram showing the layer structure of the plastic container 1 in a state where a liquid repellent agent 8 adheres to the surface of concave and convex shapes 2c.
Figure 4A:
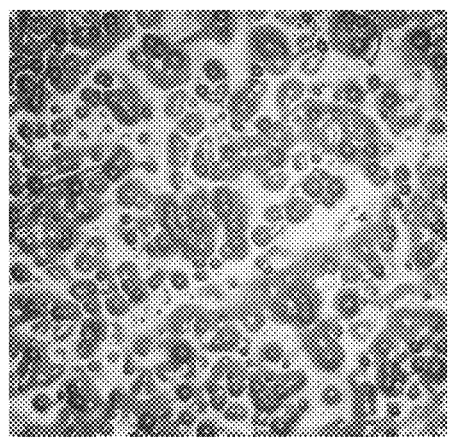
FIG. 4A and FIG. 4B are digital microscope images at a magnification of 100 times and 300 times, respectively.
Figure 4B:
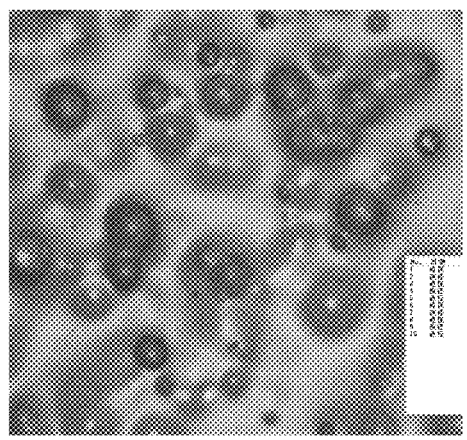

As shown in FIG. 3, it is preferable that a liquid repellent agent 8 adheres to the surface of the concave and convex shapes 2c. The slipping property can be further improved by adhering the liquid repellent agent 8 to the surface of the concave and convex shapes 2c. The liquid repellent agent 8 includes at least one of hydrophobic particles and hydrophobic and oleophobic particles. This allows the liquid repellent agent 8 to have at least one (preferably both) of water repellency and oil repellency and to inhibit adhesion of the contents even when the contents come into contact with it.

The average primary particle diameter of the hydrophobic particles is usually 3 to 100 nm, preferably 5 to 50 nm, and more preferably 7 to 30 nm. By setting the average primary particle diameter in the above range, the hydrophobic particles agglomerate moderately, and gas, such as air, can be retained in voids inside the agglomerate, so that the excellent slipping property can be realized. That is, since this agglomerated state is maintained even after adhering to the surface of the concave and convex shapes 2c, the excellent slipping property can be realized.

In the present invention, the average primary particle diameter can be measured by a scanning electron microscope (1-E-SEM), and another electron microscope, such as a transmission electron microscope may be used in combination for measurement if the resolution of the scanning electron microscope is low. Specifically, if the particles have a spherical shape, their diameter can be used, and if the particles have a non-spherical shape, the average value of the largest diameter and the smallest diameter can be regarded as the diameter. Then, the average value of the diameters of particles selected arbitrarily by observation using the scanning electron microscope and the like can be used as the average primary particle diameter.

The hydrophobic particles are not particularly limited as long as they have hydrophobic property, and those that have been hydrophobized by surface treatment may be used. For example, it is also possible to use fine particles in which hydrophilic oxide fine particles are surface-treated with a silane coupling agent or the like to make the surface state hydrophobic. The type of oxide is also not limited as long as it has hydrophobic property. For example, at least one of silica (silicon dioxide), alumina, titania and the like can be used. Among these, hydrophobic silica fine particles can be suitably used as the hydrophobic oxide particles. In particular, hydrophobic silica fine particles having a trimethylsilyl group on their surface are preferable in that more excellent non-adhesiveness can be obtained. Examples of commercially available products corresponding to this include "AEROSIL R812" and "AEROSIL R812S" (both manufactured by Evonik Degussa).

As the oleophobic particles, for example, composite particles in which the surface of oxide fine particles is coated with a fluorine-based resin or the like can be used. As the oxide fine particles, for example, at least one type of oxide fine particles selected from particles (powder) of silicon oxide, titanium oxide, aluminum oxide, and zinc oxide can be used. In particular, silicon oxide particles are preferable. Commercially available products can also be used for these oxide fine particles.

These commercially available oxide fine particles can be subjected to surface coating treatment to be suitably used as oleophobic particles. For example, regarding silicon oxide, using particles with the product name "AEROSIL 200" ("AEROSIL" is a registered trademark; the same applies hereinafter), "AEROSIL 130", "AEROSIL 300", "AEROSIL 50", "AEROSIL 200FAD", "AEROSIL 380" (all manufactured by NIPPON AEROSIL CO., LTD.) as the core, the surface of the core can be coated with a polyfluoroalkyl methacrylate resin, and the obtained oil repellent particles can be used. Regarding titanium oxide, for example, using particles with the product name "AEROXIDE $TiO_2$ T805" (manufactured by Evonik Degussa) as the core, the surface of the core can be coated with a polyfluoroalkyl methacrylate resin, and the obtained oil repellent particles can be used. Regarding aluminum oxide, for example, using particles with the product name "AEROXIDE Alu C 805" (manufactured by Evonik Degussa) as the core, the surface of the core can be coated with a polyfluoroalkyl methacrylate resin, and the obtained oil repellent particles can be used.

Since these oleophobic particles have a polyfluoroalkyl methacrylate resin on their surface, they can form a strong coating layer with relatively high adhesiveness on the surface of the particles due to their excellent affinity with the inorganic oxide particles and can also develop high non-adhesiveness to the contents.

For the liquid repellent agent 8, for example, a) a layer containing hydrophobic particles and oleophobic particles or b) a layer including a hydrophobic region containing hydrophobic particles and an oleophobic region containing oleophobic particles may be employed. By employing such a layer, the adhesion of contents can be suitably suppressed or prevented even when the contents is high in fat as well as moisture.

The content of the hydrophobic particles and the hydrophobic and oleophobic particles in the liquid repellent agent 8 is not particularly limited and can be set as appropriate, usually within the range of 10 to 100% by weight. The closer the content of the hydrophobic particles and the hydrophobic and oleophobic particles is to 100% by weight, the higher the water repellency and/or oil repellency can be obtained. Therefore, the content of the hydrophobic particles and the hydrophobic and oleophobic particles in the liquid repellent agent 8 can be set, for example, 98 to 100% by weight.

The amount of hydrophobic particles and hydrophobic and oleophobic particles adhered to the container body (weight after drying) is not particularly limited and is usually and preferably 0.01 to 10 $g/m^2$, more preferably 0.2 to 1.5 $g/m^2$, and most preferably 0.2 to 1 $g/m^2$.

Although the method for forming the liquid repellent agent 8 is not particularly limited, it can be formed by a method including a process of applying and drying coating liquid containing at least one type of hydrophobic particles and oleophobic particles.

For example, dispersion liquid obtained by dispersing at least one type of hydrophobic particles and oleophobic particles in a solvent can be suitably used.

Examples of the above solvent include organic solvents, for example, aromatic hydrocarbons, such as toluene and xylene, alicyclic hydrocarbon solvents, such as methylcyclohexane and cyclohexane, ester solvents, such as ethyl acetate and butyl acetate, ketone solvents, such as methyl ethyl ketone and acetone, alcohol solvents, such as isopropyl alcohol and denatured ethanol. These can be used alone or in combination of two or more.

The solid content of the liquid repellent agent 8 can be set as appropriate, usually within the range of 10 to 90% by weight, and particularly within the range of 20 to 80% by weight.

The coating liquid may contain other components as long as they do not interfere with the effects of the present invention. For example, resin binders, dispersants, or curing agents may be contained. In particular, in the present invention, the content of the resin component in the liquid repellent agent 8 is preferably 5% by weight or less, more preferably 1% by weight or less, and more preferably substantially 0% by weight. By setting the content of the resin component to such amount, a higher effect of preventing adhesion can be realized.

The surface of the concave and convex shapes 2c may be coated with the liquid repellent agent 8 according to a known method, and for example, the spray method, the immersion method, or the stirring granulation method can be applied. In the present invention, coating by the spray method is particularly preferable in terms of excellent coating uniformity.

A drying process is performed after application. The drying process may be either natural drying or heat drying. In the case of heat drying, the temperature can be set, for example, 50 to 160° C. In the coating of the present application, the above application and drying processes may be repeated twice or more to obtain a predetermined thickness.

2. Manufacturing Method of Plastic Container

The container 1 can be formed by blow molding of parison. The blow molding may be direct blow molding or injection blow molding. In direct blow molding, a tubular parison in a molten state extruded from an extruder is sandwiched between a pair of split molds, and air is blown into the parison to manufacture the container 1. In injection blow molding, a bottomed parison in a shape of a test tube, known as a preform, is formed by injection molding, and blow molding is performed using this parison.

In any type of blow molding, the layer structure of the parison is the same as the layer structure of the container 1. A multi-layered parison can be formed by coextrusion molding or multi-layer injection molding. An innermost layer of the parison is formed of the resin composition forming the innermost layer 2 of the container 1 (that is, the resin composition containing the base resin 2a and the filler particles 2b). Although the innermost layer of the parison does not need to have concave and convex shapes on its surface, the shape of the filler particles 2b appears, and the concave and convex shapes 2c due to the presence of the filler particles 2b are formed on an inner surface of the innermost layer 2 because the parison is expanded, and its wall thickness decreases during blow molding.

By forming the container 1 by blow molding and then directly spraying the liquid repellent agent 8 or spraying the liquid repellent agent 8 in a state dispersed or dissolved in a medium (dispersion medium or solvent), the liquid repellent agent 8 can adhere to the surface of the concave and convex shapes 2c. When the medium is used, a drying process may be performed as appropriate.

EXAMPLES

1. Sample Preparation

Manufacturing Example 1

The container 1 having a shape shown in FIG. 1 was manufactured by direct blow molding of a parison. The innermost layer of the parison was formed of a resin composition containing the base resin 2a and the filler particles 2b. The base resin 2a is polyethylene (melting point: 112° C.), and the filler particles 2b are acrylic resin (melting point: 230° C.) having an average particle diameter of 30 μm. The content of the filler particles in the resin composition was 20% by mass.

The thickness of the innermost layer of the parison was adjusted so that the thickness of the innermost layer 2 at the center of the container 1 in the vertical direction was 20 μm.

Manufacturing Examples 2 to 10

The container 1 was manufactured in the same manner as in Manufacturing Example 1, except that the content of the filler particles 2b, the average particle diameter D of the filler particles 2b, and the thickness T of the innermost layer 2 of the container 1 were changed as shown in Table 1.

TABLE 1

|  | Manufacturing Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Content of filler particles (% by mass) | 20 | 20 | 20 | 20 | 20 | 20 | 20 | 15 | 50 | 40 |
| Average particle diameter D of filler particles (μm) | 30 | 30 | 30 | 30 | 50 | 50 | 50 | 30 | 30 | 30 |
| Thickness T of innermost layer of container (μm) | 20 | 30 | 40 | 50 | 40 | 50 | 60 | 30 | 30 | 30 |
| T/D | 0.67 | 1.00 | 1.33 | 1.67 | 0.80 | 1.00 | 1.20 | 1.00 | 1.00 | 1.00 |
| Test on particle detachment | B | A | A | A | A | A | A | A | B | A |
| Test on concave and convex shapes | A | A | A | B | A | A | A | B | A | A |

2. Evaluation 2-1. Test on Particle Detachment

A test piece (approximately 10 mm×50 mm) was cut out from the container 1 and is polished with synthetic paper (product name "Kimwipe" manufactured by Nippon Paper Crecia), and the detachment of fine particles was visually observed and evaluated according to the following criteria.

A: The detachment of the particles were not observed even after polishing 10 times or more.

B: The detachment of the particles were observed after 3 to 9 times of polishing.

C: The detachment of the particles were observed after polishing twice or less.

2-2. Test on Concave and Convex Shapes

The surface roughness S a of the concave and convex shapes formed on the inner surface of the container 1 was measured using a digital microscope (image dimension measuring device) and was evaluated according to the following criteria.

A: 2.5 μm or more

B: 2 μm or more and less than 2.5 μm

C: Less than 2 μm

3. Measurement of Particle Diameter

The inner surface of the container 1 of Manufacturing Example 5 was photographed at a magnification of 100 times and 300 times using a digital microscope (image dimension measuring device). The particle diameter of 10 filler particles 2b in the photograph taken at a magnification of 300 times was measured, and the arithmetic average of the measured values was 48.7 μm.

REFERENCE SIGNS LIST

1: plastic container, 2: innermost layer, 2a: base resin, 2b: filler particle, 2c: concave and convex shapes, 3: intermediate layer, 4: adhesive resin layer, 5: barrier layer, 6: adhesive resin layer, 7: outermost layer, 8: liquid repellent agent, 11: thread, 12: spout, 13: cap, 14: body portion

The invention claimed is:

1. A plastic container for storing contents,
wherein the plastic container is a blow molded body,
an innermost layer in contact with the contents is formed of a resin composition containing a base resin and filler particles, and
an inner surface of the innermost layer is provided with concave and convex shapes due to presence of the filler particles, wherein
the base resin is polyolefin,
T/D is 0.80 to 1.40 where T represents an average thickness of the innermost layer at a center of the plastic container in a vertical direction, and D represents an average particle diameter of the filler particles,
the resin composition has a content of the filler particles of 20 to 40% by mass, and
the average particle diameter of the filler particles is 10 to 100 μm.

2. The plastic container of claim 1, wherein at least a part of the filler particles is exposed from the inner surface of the innermost layer.

3. The plastic container of claim 1, wherein the filler particles are formed of an acrylic resin.

4. The plastic container of claim 1, wherein a liquid repellent agent adheres to a surface of the concave and convex shapes.

5. A manufacturing method of the plastic container of claim 1, comprising:
a molding step of blow molding a parison,
wherein an innermost layer of the parison is formed of the resin composition, and
the parison is expanded so that the concave and convex shapes are formed on an inner surface of the innermost layer by the filler particles.

* * * * *